United States Patent [19]

Teowee et al.

[11] Patent Number: 5,384,294

[45] Date of Patent: Jan. 24, 1995

[54] SOL-GEL DERIVED LEAD OXIDE CONTAINING CERAMICS

[75] Inventors: Gimtong Teowee; Jonathan M. Boulton; Donald R. Uhlmann, all of Tucson, Ariz.

[73] Assignee: The United States of America as represented by the Secretary of the Air Force, Washington, D.C.

[21] Appl. No.: 159,967

[22] Filed: Nov. 30, 1993

[51] Int. Cl.$^6$ .............................. C04B 35/49
[52] U.S. Cl. ..................... 501/134; 501/12; 252/62.9; 423/593; 423/598; 423/608; 423/610
[58] Field of Search ................ 501/12, 134; 252/62.9; 423/593, 598, 608, 610

[56] References Cited

U.S. PATENT DOCUMENTS

| | | | |
|---|---|---|---|
| 3,725,298 | 4/1973 | Woodhead et al. | 252/62.9 PZT |
| 4,397,666 | 8/1983 | Mishima et al. | 501/12 |
| 4,925,647 | 5/1990 | Kirchhöfer | 501/12 |
| 4,946,710 | 8/1990 | Miller et al. | 252/62.9 PZT |
| 4,970,182 | 11/1990 | Shirasaki | 501/134 |
| 5,047,174 | 9/1991 | Sherif | 252/309 |
| 5,076,901 | 12/1991 | Whatmore et al. | 204/192.15 |
| 5,091,348 | 2/1992 | Woodhead et al. | 501/136 |
| 5,093,291 | 3/1992 | Kawabata et al. | 501/134 |
| 5,096,642 | 3/1992 | Shirasaki | 264/66 |
| 5,114,891 | 5/1992 | Kunz et al. | 501/127 |
| 5,169,576 | 12/1992 | Anderson et al. | 501/12 |
| 5,196,388 | 3/1993 | Shyu | 501/134 |

*Primary Examiner*—Mark L. Bell
*Assistant Examiner*—Deborah Jones
*Attorney, Agent, or Firm*—Stanton E. Collier; Thomas C. Stover

[57] ABSTRACT

Method is provided for preparing PbO-based ceramics by mixing metal cations in alkanolamines and then adding the mixture to lead carboxylates in alcohol, to obtain ceramic solutions or gels therefrom. The metal cations are sourced from metal alkoxides, chelates and salts and include metals of Ti, Zr and La. The above solutions and gels can be employed to form PbO-based powders, fibers and films, e.g. films of PZT and PLZT, which find electrical and optical applications such as ferroelectric memory and dielectric waveguides. The invention resides in the above method and resulting PbO ceramics which have e.g. films of considerably higher dielectric constants than previously known in the art.

15 Claims, No Drawings

SOL-GEL DERIVED LEAD OXIDE CONTAINING CERAMICS

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to the methods of preparation of various PbO-based ceramics, particularly ceramics of various forms including thin films and the resulting products of such methods.

2. The Prior Art

In prior art sol-gel precursor solutions, film formation or fiber drawing is only possible when the sol has achieved a certain viscosity as a result of condensation of species within the solution. Hence a relatively narrow window and processing time exists. Additionally, the rheology of the sol changes over the period of drawing. When applied to large-scale commercial production, the film or fibers as drawn initially, differ somewhat in morphology, diameter and other properties from those drawn later, resulting in problems with reproducibility and consistency.

Also the use of unmodified alkoxides in the preparation of precursors suitable for sol-gel processing unfortunately lead to limited shelf life of these precursors since further hydrolysis and condensation of the alkoxy species can alter the nature of the oligomeric species, resulting in a time-dependent effect on the final properties of the product.

Accordingly, there is a need and market for a method for preparing lead-containing ceramics that can be processed to high purity solutions and gels and then to powders, fibers or thin films. The method of the present invention should provide a relatively wide processing window, precursors of prolonged shelf life and otherwise obviate the above prior art shortcomings.

There has now been discovered a method for preparing PbO based ceramics of wide processing window, which process provides durable ceramic products including powders, fibers and thin films of high dielectric constant.

Thus the invention relates to the preparation of various PbO based ceramics of various forms such as powders, fibers and thin films using a wet chemical technique which relies on the use of alkanolamine-modified solutions of lead acetate and various metal alkoxides or salts. Of particular interest is the preparation of ferroelectric films of the PLZT family which have a myriad of electrical and optical applications such as ferroelectric memory, dielectric waveguides, high dielectric constant capacitors, pyroelectric detectors and second harmonic generation. Compositions selected are not restricted to the PLZT systems alone, as the invention is also suitable for preparing lead oxide, lead silicate, lead germanate, lead magnesium niobate materials and other lead oxide containing systems.

SUMMARY OF THE INVENTION

Broadly, the present invention provides a method (and the resulting products) for preparing PbO based ceramics by mixing metal cations in alkanolamines and then adding the mixture to lead carboxylates in alcohol. The metal cations, other than lead, are sourced, e.g. from metal alkoxides, chelates or salts. Examples of these components are given below.

In the above method the metal cations in alkanolamines can include one or both of the following reactions:

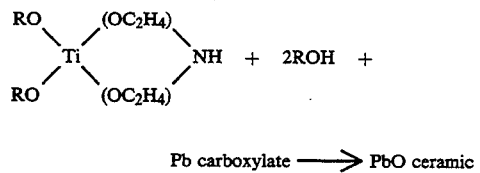

Pb carboxylate ⟶ PbO ceramic where R is $C_nH_{2n+1}$ and n is 1-5.

and/or

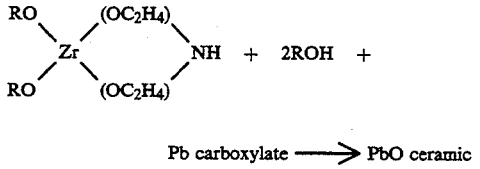

Pb carboxylate ⟶ PbO ceramic where R is $C_nH_{2n+1}$ and n is 1-5.

By PbO "ceramic" as used herein, is meant a ceramic product containing PbO, e.g. PZT, PLZT, lead silicates, lead, magnesium niobate $Pb(Mg_{\frac{1}{3}}Nb_{\frac{2}{3}})O_3$.

The invention further includes PbO-based ceramic solutions and gels and products thereof (such as powders, fibers and thin films) prepared according to the methods of the invention.

The above products include films of PZT and PLZT as discussed below.

DESCRIPTION OF PREFERRED EMBODIMENTS

The method of the invention thus relates to the wet chemical synthesis of PbO-based ceramics utilizing lead carboxylates as the source for lead and alkanolamines, metal alkoxides, chelates or salts. A principal lead carboxylate salt used is lead acetate trihydrate, $Pb(CH_3COO)_2 \cdot 3H_2O$, preferably of a high purity grade (e.g. 99.999% cation purity) in order to achieve the maximal material purity.

The fact that high purity lead acetate trihydrate can be used as a precursor, which is much easier to handle than lead alkoxides, can lead to high purity final ceramic products such as powders, fibers or thin films.

The cations other than lead can originate from metal alkoxides or salts. In the case of PZT, zirconium and titanium alkoxides can be utilized as precursors. These include, for example, zirconium n-propoxide, zirconium methoxide, zirconium ethoxide, titanium ethoxide, titanium isopropoxide, titanium butoxide, etc. By careful preparation and purification steps, these alkoxides can be prepared in high purity form. For example, the titanium isopropoxides used in the examples are distilled under reduced pressure to obtain a very pure titanium isopropoxide which is a colorless liquid at room temperature.

The alkanolamines preferably used are the ethanolamines, $H_{3-n}N(C_2H_5OH)_n$ where $n=1,2$ or 3. These compounds are monoethanolamine (MEA), diethanolamine (DEA) and triethanolamine (TEA) for $n=1, 2$ and 3. Lead acetate does not dissolve readily in alcohols such as ethanol or isopropanol, but does in methanol with vigorous stirring. It has been found, however, that the presence of alkanolamines, in particular DEA, helps the dissolution of lead acetate in the higher alcohols.

The alkanolamines can be introduced into the precursor solutions by modifying the appropriate metal alkoxides in the appropriate molar ratios with alkanolamines. It has been found that these modified alkoxides are less reactive and hygroscopic than their unmodified counterparts. Hence they are much easier to handle and process. The reaction of alkanolamine with metal alkoxides is generally exothermic.

It has also been found that there is an optimal molar ratio of the alkanolamines to the metal alkoxides, which depends on the metal alkoxide and alkanolamine. A 1:1 molar ratio of the alkanolamines to metal alkoxides is preferred to achieve the optimal effect. Excessive alkanolamines (2:1 molar ratio of alkanolamines to metal alkoxides, e.g.) can give difficulties in subsequent decomposition of organics, while a low ratio will not be effective due to insufficient substitution of the alkoxy groups.

That is, the sequence of adding alkanolamine in the precursor solution impacts significantly in the final properties of the products.

Thus it is preferred to introduce, e.g. DEA by reacting it in a 1:1 molar ratio, with, e.g. the alkoxides of Zr and/or Ti, prior to mixing the alkoxides with an alcohol, e.g. a methanolic solution.

The presence of alkanolamines can also aid in solubilizing metal salts in the precursor solutions. For example, lead acetate trihydrate, when dissolved in methanol in the presence of DEA remains clear when lanthanum nitrate is added. In the absence of DEA, copious precipitation occurs.

As embodied in the present invention, the first step in making PbO-based ceramics involves obtaining a precursor solution containing the appropriate type and amount of metal cations, usually in an alcoholic medium (i.e. alcohols having 1-8 carbon atoms or more). Lead acetate trihydrate is used predominantly as the source for lead, while the other metal cations can be derived either from alkoxides or salts such as carboxylates, nitrates or chelates, modified with alkanolamines. The alkanolamines, in particular DEA, not only enhance the stability of the alkoxides by reducing their degree/rate of hydrolysis, but also aid in dissolving the lead acetate within an alcoholic medium. A high degree of homogeneity is achieved in the gels and thin films obtained using the precursors outlined in this invention since no intermediate Pb, PbO or $ZrO_2$ phases have been detected upon firing the gels or thin films.

Water can be added in addition to the water of hydration from the lead acetate trihydrate. The precursor solutions are extremely stable, lasting for months without any conspicuous precipitation. The viscosities of these solutions also do not change appreciably over time, thus aiding the reproducibilities of powders, fibers or thin films derived from these precursors. These precursor solutions are suitable to make powders (from bulk gels or spray-dried), fibers or thin films.

Spray-drying of the Pb-containing powders can be performed by first precipitating out the precursor solutions using $NH_3$ and later spray drying these co-precipitates in a typical spray-dryer. The benefit of one embodiment of this invention during spray-drying of the Pb-containing powders is the enhanced stability (hence ease of handling) and the high degree of homogeneity of the precursor solution before precipitation (hence also a high degree of homogeneity among the precipitates after precipitation and before spray-drying).

Fibers can be drawn during a certain range of solution concentration. Too concentrated a solution results in coarse fibers, while too dilute a solution does not result in any fibers at all. Fibers can be drawn using a precursor solution based on 1-1 alkoxide to DEA ratio, but these fibers were found to be tacky, hard to dry and tended to flow or deform quite readily, resulting in flattened-looking fibers. It was necessary to adjust the alkoxide-DEA ratio down to 1-0.5; fibers then obtained were quite drawable, not tacky, and dried almost completely upon drawing. The further addition of PVP (polyvinylpyrrolidone) or other polymers provided effective control of the sol rheology and made it possible to draw long fibers of uniform diameter. There exists an optimum amount of PVP to modify effectively the sol rheology, since too much can affect the organic burn-out of the fiber. About 0.5 to 10 wt % and preferably about 2.5 wt % of PVP was typically used in precursor solutions for fiber drawing.

As noted above in prior art sol-gel precursor solutions, fiber drawing is only possible when the sol has achieved a certain viscosity. Thus a relatively narrow window and processing time exists. Also as noted above, the rheology of the sol changes over the period of drawing, particularly on a large scale commercial application. In contrast, the solutions of the present invention only need to be concentrated to a certain molar range. And the window in processing time, when uniform fibers can be drawn, is quite broad (days to weeks).

In producing fibers of PZT, post-spinning sintering is preferably carried out with a temperature range of 750°–1000° C. At lower temperatures, porous fibers are produced, while at higher temperatures, volatilization of PbO also produces porosity.

Other PbO-containing fibers such as $PbTiO_3$ $PbZrO_3$ and PMN can also be obtained by using appropriate precursor solutions.

These PbO-based ceramic solutions are useful in the making of ceramic films. That is, precursor solutions for films made by e.g. spin coating, are prepared using, e.g. lead acetate trihydrate in methanol and separate solutions of Ti and Zr alkoxides in, e.g. DEA. Then the solutions are combined and refluxed to insure a high degree of mixing and molecular level interaction. Refluxing is performed, e.g. for three hours and the solutions later concentrated to 1.0M solutions and stirred overnight. To prolong their shelf lives, they are desirably stored in a refrigerator.

Substrates for such PZT films are, e.g. platinized (sputtered, about 2000 Å thick) oxidized Si wafers about 2″ in diameter.

The PbO-based ceramic solution of the invention is applied to the substrates through a syringe with a 0.2 um PTFE filter. Spin coating is desirably performed in a clean room using a Headway Spinner at 2000 RPM for about 20 sec. When a 0.3M solution were used during spincoating, films with a thickness in the range of 500 Å per application after firing at 500° C., were obtained. For a 1.0M solution, the thickness per coating was about 1700 Å. Multiple coatings are used to achieve thicker coatings. In between successive coatings, the overall films are subjected to a 500° C. treatment under $O_2$ for 30 mins to oxidize the organics and consolidate the films.

The PZT films of the invention are fired at the final crystallization temperatures, ranging from 550° C. to 750° C. for various times (30 min. to 2 hrs. but typically for 30 min.). Heating rates vary from 1° to 20° C./min in rapid thermal annealing. In rapid thermal annealing, the wafers are placed in a quartz plate, immersed directly into a furnace pre-set at a selected temperature and after treatment for a desired time, are naturally cooled in the furnace. $O_2$ is desirably used as the furnace atmosphere at a flow rate of, e.g. 200 cc/min.

Excess PbO often improves the microstructures of the films. That is, one employs, e.g. excess lead acetate trihydrate (in methanol) in mixing with the cation solutions (of, e.g. metal carboxylates or salts in DEA) when mixed as discussed above. The microstructures typically consist of well developed large grains (up to 5 um, depending on firing temperature) and exhibit a high degree of crystallinity. With increasing amounts of excess PbO, the grain size was larger and the proportion of intergrain phase appeared to diminish. The densest PZT microstructures were displayed by films fired at 750° C. with 5.0 mole % excess PbO. These films have a fine grain size ($\sim 1$ um) with no presence of any dark intergrain phase. The outstanding microstructural feature produced by excess lead is the absence of the rosette structures which are prominent in films having no excess PbO which are fired to high temperatures.

PZT films derived from this invention exhibit superior ferroelectric and dielectric properties compared to other PZT films prepared either by sol-gel or physical deposition processes. Dielectric constants of the PZT 53/47 films using this invention, can be achieved as high as 3000 which are the highest reported values in the literature. Note that the corresponding values of dielectric constant for the best bulk (prior art) PZT ceramics are less than 1500. PZT films can be obtained fatigue-free beyond $10^8$ polarization reversals and also exhibit very low aging rates. They are thus very suitable for ferroelectric memory applications.

The following examples are intended to illustrate the method embodiments of the present invention and should not be construed in limitation thereof.

EXAMPLE I

A PZT precursor solution having the stoichiometry ratio 1.15:0.53:0.47 of Pb:Zr:Ti was prepared. 30 g of lead acetate trihydrate, $Pb(OOCCH_3)_2\text{-}3H_2O$ was mixed in a flask with about 150 cc of distilled methanol. In separate containers, 15.91 g of Zr (n-propoxide) $Zr(OC_2H_5)_4$ was reacted with 3.84 g of diethanolamine in a 1:1 molar ratio leading to an exothermic reaction where the alkoxide then turned yellowish. Similarly 8.60 g of Titanium isopropoxide, $Ti(OC_2H_5)4$, was mixed with 3.40 g of diethanolamine in a 1:1 molar ratio. These modified alkoxides were next added to the methanolic solution of lead acetate and refluxed for 3 hours. The obtained light yellow solution was then concentrated to 1.0 m precursor solution using a rotary evaporator.

This solution was used to spincoat on platinized Si wafers. A 0.3 coating cycle was utilized to achieve a final thickness of about 0.5 um with a 500° C. intermediate firing between each coating. By firing to 750° C. where single-phase peroskite film was achieved, the PZT film exhibited a large signal dielectric constant value of 3000, remanent polarization of 20 $uC/cm^2$ (C=coulombs) and a coercive field of 30 kV/cm. The value of dielectric constant is the highest reported in the literature for any sol-gel derived or physical vapor deposited film.

EXAMPLE II

A PZT precursor solution having the stoichiometry ratio 1.15:0.65:0.35 of Pb:Zr:Ti was also prepared by dissolving 30 g of lead acetate trihydrate, $Pb(OOCHH_3)_2\text{-}3H_2O$; in about 150 cc of distilled methanol. Separately 19.51 g and 6.41 g of Zr n-propoxide, $Zr(OC_2H_5)_4$, and Ti isopropoxide, $Ti(OC_2H_5)4$ were reacted with 4.70 g and 2.53 g of diethanolamine respectively in a 1:1 molar ratio. They were then added to the Pb acetate solution. The light yellow solution was refluxed for about 3 hours and lastly concentrated to 1.0 m solution using a rotary evaporator.

PZT 65/35 films fired to 700° C. obtained by using this precursor, exhibited a dielectric constant of about 700 which is higher than the value of corresponding bulk PZT 65/35 ceramics ($\sim 350$).

EXAMPLE III

A PLT 28 (lead lanthanum titanate) precursor solution was prepared having a stoichiometry ratio 0.828:0.28:0.93 of Pb:La:Ti. About 30 g of lead acetate trihydrate, $Pb(OOCCH_3)\text{-}3H_2O$ was mixed in a flask with about 150 cc of methanol. Separately 23.64 g of Ti isopropoxide was reacted with 9.34 g of diethanolamine. Separately 11.58 g of La nitrate, hydrate La $(NO_3)_3\text{-}6H_2O$, was mixed with 2.81 g of diethanolamine in a 1:1 molar ratio in methanol. The diethanolamine-modified Ti alkoxides and methanolic La nitrate solutions were next added to the lead acetate solution in methanol. The mixed solution was refluxed for about 3 hours. Finally, the light yellow solution was concentrated to 1.0 m solution by using a rotary evaporator. PLT 28 films fired to 700° C. derived from this precursor, exhibited a dielectric constant as high as 1100.

EXAMPLE IV

A PLZT 12/65/35 precursor solution having a stoichiometry ratio 1.012:0.12:0.6305:0.3395 of Pb:La:Zr:Ti was prepared. About 30 g of lead acetate trihydrate, $Pb(OOCCH_3)_2\text{-}3H_2O$, was mixed in a flask with about 150 cc of distilled methanol. In separate containers, 21.51 g and 7.06 g of Zr n-propoxide, $Zr(OC_2H_5)_4$, and Ti isopropoxide, $Ti(OC_2H_5)_4$, were reacted with 5.18 g and 2.79 g of diethanolamine respectively, in a 1:1 molar ratio. Also 4.06 g of $La(NO_3)_3\text{-}6H_2O$ was reacted with 0.99 g of diethanolamine in methanol. The modified alkoxides and $LaNO_3$ solution was added to the methanolic lead acetate solution and refluxed for 3 hours. The light yellow solution was then concentrated to 1.0 m by using a rotary evaporator.

Thus the methods embodying the invention provide PbO-based ceramics of high stability and higher dielectric constants than previously seen in the prior art.

Per the invention PZT films and PLZT, films are readily prepared. These films have numerous electrical and optical applications, including ferroelectric memory, dielectric waveguides and other applications as noted above.

What is claimed is:

1. A method for preparing precursor solutions for PbO-based ceramics comprising mixing metal cations in alkanolamines and then adding the mixture to lead carboxylates in alcohol.

2. The method of claim 1 wherein said lead carboxylate is lead acetate trihydrate.

3. The method of claim 1 wherein said metal cations are compounds selected from the group consisting of metal alkoxides, chelates and salts.

4. The method of claim 3 wherein said metal cations are selected from the group consisting of Ti, Zr and La and mixture thereof to form said ceramics.

5. The method of claim 3 wherein said metal cations are Ti plus Zr to form a ceramic of PZT.

6. The method of claim 3 wherein said metal cations are Ti, Zr and La to form a ceramic of PLZT.

7. The method of claim 1 wherein said alkanolamines are ethanolamines, $H_{3-n}N(C_2H_5OH)_n$, where $n=1$, 2 or 3 including monoethanolamine (MEA), diethanolamine (DEA) and triethanolamine (TEA).

8. The method of claim 1 wherein lead acetate trihydrate in methanol is reacted with one or more metal alkoxides or salts of Ti, Zr and La to form a solution of PLZT (Pb; La; Zr; Ti).

9. The method of claim 4 wherein said metal cations in alkanolamines include the following reaction:

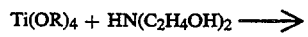

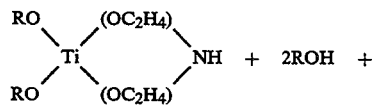

where R is $C_nH_{2n+1}$ and n is 1-5.

10. The method of claim 4 wherein said metal cations in alkanolamines include the following reaction:

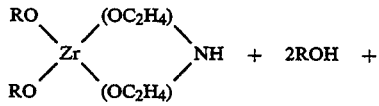

where R is $C_nH_{2n+1}$ and n is 1-5.

11. A PbO-based ceramic formed from the precursor solution made according to the method of claim 1 by spin coating said solution onto a substrate followed by firing said solution at elevated temperatures.

12. A PbO-based ceramic film formed from the precursor solution made according to the method of claim 3 by spin coating said solution onto a substrate followed by firing said solution at elevated temperatures.

13. The film of claim 12 consisting of PZT having a dense microstructure, wherein the firing takes place at 750° C. and wherein the precursor solution contains 5.0 mole % excess PbO.

14. The PZT film of claim 13 having a dielectric constant of 1500 to 3000.

15. The film of claim 12 selected from the group consisting of PZT (Pb: Zr: Ti) and PLZT (Pb: La: Zr: Ti).

* * * * *